United States Patent [19]

Suzuki

[11] 4,305,102
[45] Dec. 8, 1981

[54] MULTI-CHANNEL HEAD DEVICE AND ITS MANUFACTURING METHOD

[75] Inventor: Shigehisa Suzuki, Amagasaki, Japan

[73] Assignee: Mitsubishi Denki Kabushiki Kaisha, Tokyo, Japan

[21] Appl. No.: 109,081

[22] Filed: Jan. 2, 1980

[30] Foreign Application Priority Data

Jan. 5, 1979 [JP] Japan ................................ 54/483

[51] Int. Cl.³ .................... G11B 5/60; G11B 17/32; G11B 21/20
[52] U.S. Cl. .................................... 360/103; 29/603; 360/104
[58] Field of Search ............... 360/103, 104, 105, 109; 29/603

[56] References Cited

U.S. PATENT DOCUMENTS

| | | | |
|---|---|---|---|
| 3,593,326 | 7/1971 | Turner et al. | 360/103 |
| 3,593,330 | 7/1971 | Ackley | 360/103 |
| 4,058,843 | 11/1977 | Gyi | 360/103 |
| 4,141,050 | 2/1979 | Wiseley | 360/104 |
| 4,197,566 | 4/1980 | Suzuki | 360/104 |

*Primary Examiner*—Alfred H. Eddleman
*Attorney, Agent, or Firm*—Oblon, Fisher, Spivak, McClelland & Maier

[57] ABSTRACT

A fixed type multi-channel head device with a plurality of floating head sliders held thereby, is provided with a sheet of positioning spring member having a number of individual gimbal spring portions each integrally holding at the central part one floating head slider, a sheet of load spring member including a number of gimbal spring portions or cantilever type spring portions applying load from the rear sides of a plurality of sliders to said floating head sliders, respectively, and a plurality of pivots disposed between the pairs of spring portions of the positioning and load spring member, each separating one spring portion of the paired ones from the other spring. The positioning and the load spring members are superposed such that the tip of each pivot comes in contact with the central part of the rear surface of each floating head slider.

2 Claims, 11 Drawing Figures

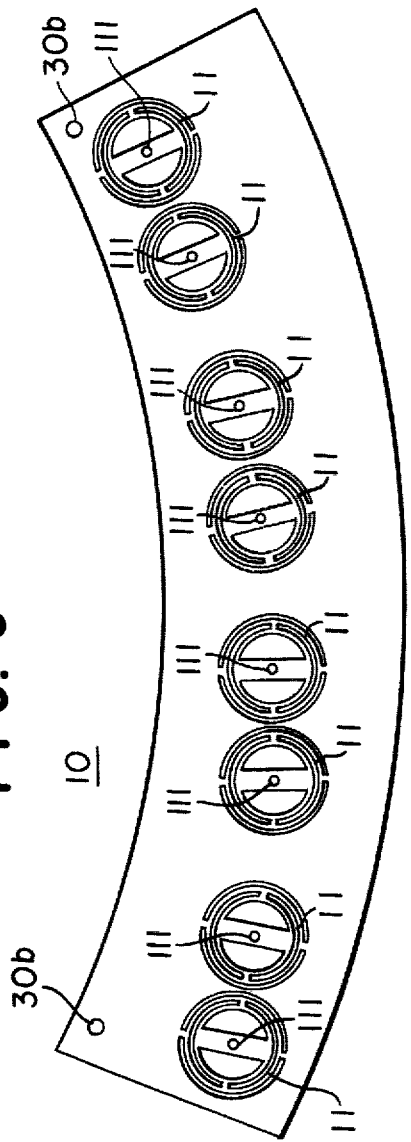
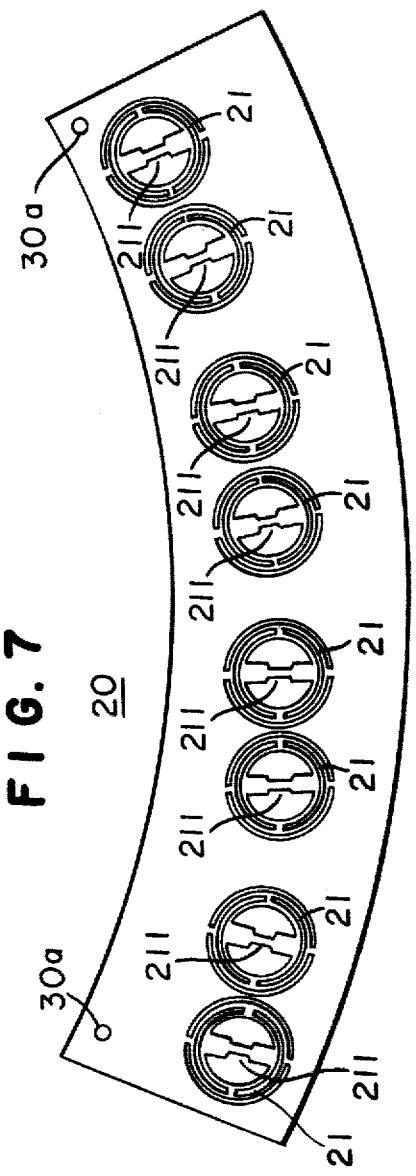

MULTI-CHANNEL HEAD DEVICE AND ITS MANUFACTURING METHOD

BACKGROUND OF THE INVENTION

1. Field of the Invention

The invention relates to a fixed type multi-channel head device for holding a plurality of floating head sliders serving as a part of a magnetic memory device and its manufacturing method.

2. Description of the Prior Art

In the conventional magnetic memory apparatus using a magnetic disc, a magnetic head device with dynamic pressure type floating head sliders has been used. It is necessary to precisely flow a floating head slider on a recording surface of a rotating magnetic disc which is moved in a complicated movement. It is necessary to use a floating head slider holding apparatus having excellent followability since it is necessary to reduce a floating distance in order to attain a high dense recording.

A multi-channel magnetic head device of the fixed head type for holding a number of floating head sliders has a head holder provided with a number of floating head sliders and supporting members individually mounted with the same number as that of the sliders. An example of the conventional magnetic head device of this type follows.

FIG. 1 shows a front view of an example of a conventional fixed type multi-channel head device. FIG. 2 shows a cross sectional view taken along line A—A in FIG. 1. A floating head slider (1) (referred to as a slider) formed in one piece with a magnetic head is caulked or fastened by adhesives to a spring (2a) for holding and positioning in place the slider (1) of a supporting member (2). A spring (2b) for applying a load to the slider (1) of the supporting member (2) presses the slider (1) against the recording surface (9) of a magnetic disc plate (8) by a given load, through a pivot (5) provided at the central part of the rear surface of the slider (1).

The positioning spring (2a) and the loading spring (2b) are integrally assembled into the supporting member (2). As shown, the pivot (5) is formed by properly shaping the positioning spring (2a). The loading spring (2b) has a gentle-sloping projection (6) in contact with the tip of the pivot (5). The combination of the pivot (5) and the projection (6) provides a pivot function. The supporting member (2) with a slider (1) fixed thereto is fixed by the spot-welding to a support (7) which is also fixed to a head holder (4) through a mounting hole (3) by caulking.

A head assembly having the slider (1), the supporting member (2), and the support (7) is manufactured through many processes: a pivot shaping process for the supporting member; bending and spot-welding process for the loading spring; spot-welding for fixing the supporting member (2) to the support (7). Thus, the conventional magnetic head assembly has the expensive head assembly requiring much time and labour to manufacture.

In the fixed type multi-channel head device a plurality of head assemblies must be individually fixed to a head holder (4), as shown in FIG. 1. In fixing the head assemblies onto the head holder (4), the sliders (1) of the assemblies, each slider generally including a plurality of magnetic head portions (channels), must be accurately arranged on the head holder (4) so that the magnetic heads of the sliders form a group of tracks to record the information thickly and concentrically arranged on the recording surface (9) without useless spaces between the adjacent tracks. To this end, precisely working tools and much time and labour are required to assemble, eventually resulting in a costly head device.

SUMMARY OF THE INVENTION

Accordingly, an object of the invention is to provide a multi-channel head device which is easy in assembling with a high reliability and enables data to record with high density.

Another object of the invention is to provide a multi-channel head device comprising a plurality of floating head sliders, a sheet of positioning spring member having a number of individual spring portions each holding integrally one floating head slider, a sheet of load spring member including a number of individual spring portions applying load to the floating head sliders, respectively, and a plurality of pivot means disposed between the pairs of spring portions of the positioning and load spring member, each separating one spring portion of the paired ones from the other spring, wherein the positioning and the load spring members are superposed such that the tip of each pivot comes in contact with each floating head slider.

BRIEF DESCRIPTION OF THE DRAWINGS

FIG. 6 shows a front view of a loading spring;

FIG. 7 shows a front view of a positioning spring;

DETAILED DESCRIPTION OF THE PREFERRED EMBODIMENTS

Figure 3:
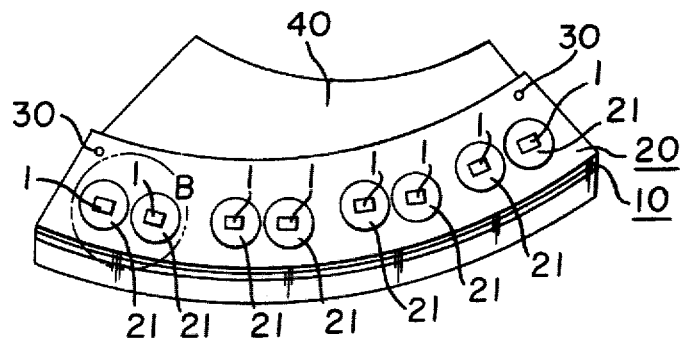
FIG. 3 shows a front view of an embodiment of a multi-channel head device according to the invention.
Figure 4:
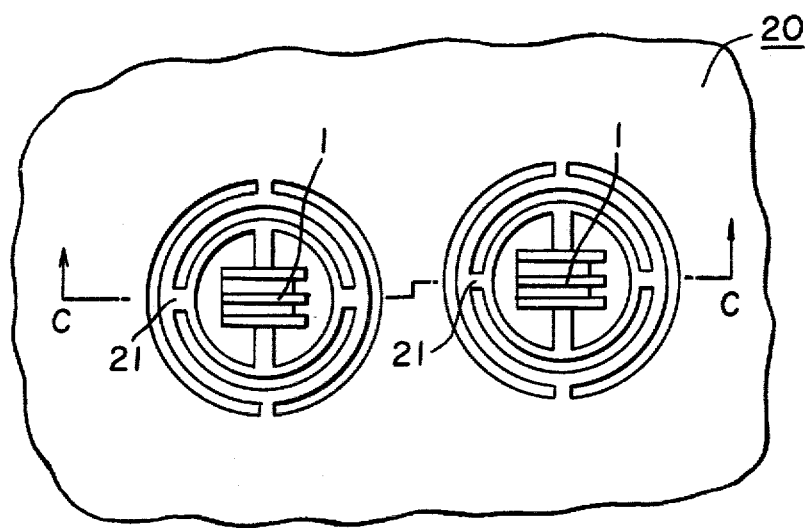
FIG. 4 shows an enlarged view of a portion in FIG. 3.
Figure 5:
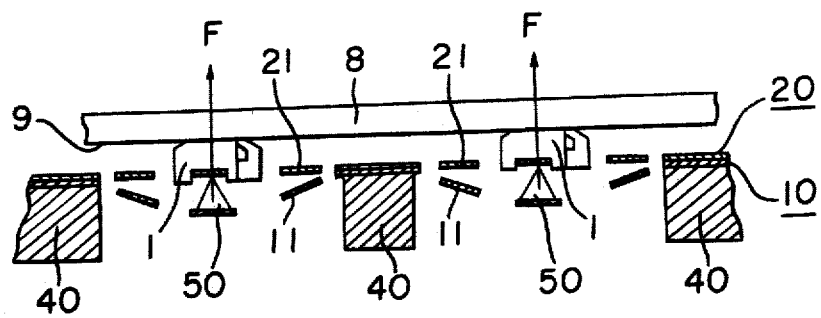
FIG. 5 shows a cross sectional view taken along line C—C shown in FIG. 4.

FIG. 3 shows an embodiment of a fixed type multi-channel head device according to the invention; FIG. 4 shows an enlarged view of a portion B in FIG. 3 and FIG. 5 shows a cross sectional view when the head device is used in a state shown by the line C—C cross section in FIG. 4. Like reference numerals are used to designate like or equivalent portions in FIG. 1.

A slider (1) with a read/write means for a magnetic recording medium is caulked or bonded to the central portion of one of positioning springs (21) formed in a positioning spring (20) made of one piece spring member by etching or the like. In the embodiment, the spring (21) is a gimbal spring. A load spring (10) with a plurality of gimbal springs (11) having a pivot (50) at the central part thereof, in which the load spring (10) is formed upon a sheet of spring member by the art of etching, for example, is mated with the positioning spring (20) by bonding or spot-welding. In the mating of them, the load spring (10) is positioned with respect to the positioning spring (20) under the reference of a positioning mark or hole (30) so that the tip of the pivot (50) comes in contact with the central part of the slider (1). The combination of the spring (10) and (20), which are thus mated, is positioned by reference to the positioning hole (30) and is bonded or spot-welded to the head holder (40) made of metal. The spring sheet member to be etched for making the positioning spring (20) and the load spring (10) may be made of material such as phosphorus bronze, beryllium copper, and stainless for spring (SUS 301, 304 of the Japan Industrial Standard (JIS)). When beryllium copper or phosphorus bronze is used, it is preferable to apply the surface treatment (plating) to the sheet member, in order to prevent it from being corroded.

Figure 8:
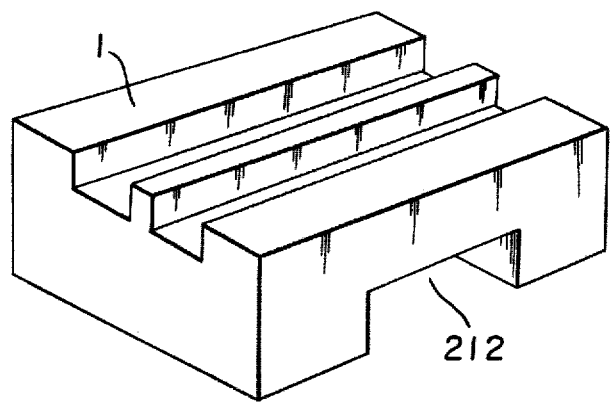
FIG. 8 shows an enlarged perspective view of a head slider.
Figure 9:
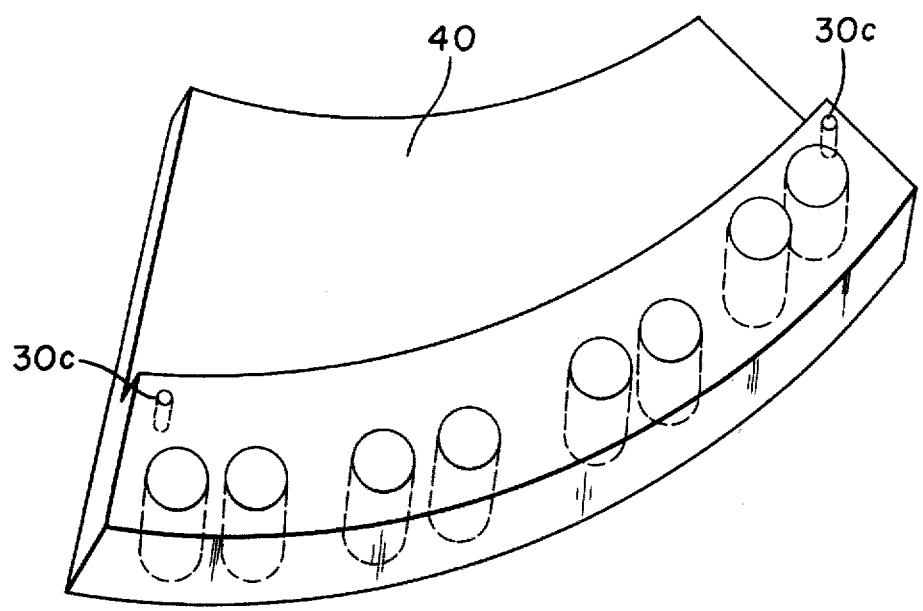
FIG. 9 shows a perspective view of a head holder.

An example of a manufacturing process of the major parts forming a multi-channel head will be described with reference to FIGS. 6 to 9. FIGS. 6 and 7 show front views of a load spring member (10) and a positioning spring member (20). The load spring member (10) is subjected to an etching process to form a plurality of load spring portions (11) as gimbal springs, pivot fitting holes (111) for fitting pivots and a positioning hole (30b) used in the assembling stage. Similarly, the positioning spring member (20) is etched to form a plurality of positioning spring portions (20) as gimbal springs, narrowed portions (211) each fitted into a U-shaped fitting groove (212) shown in FIG. 8 when those are assembled, and positioning holes (30a) used in the assembling stage. In this way, following this etching step for the load spring member (10) and the positioning spring member (20), pivots (not shown) are bonded or fitted to the respective load spring portions (11) by taking advantage of the fitting holes (111). The load spring member (10) with the pivots mounted thereto and the positioning spring member (20) are temporarily assembled into a head holder (40) made of metal material shown in FIG. 9 taking advantage of positioning holes (30a), (30b) and (30c), by means of proper positioning means such as pins. After this assembling step, the fitting, narrowed portions (212) of the slider (1) shown in FIG. 8 are firmly fixed into the slider insertion grooves (21) of the positioning spring portions (21) of the positioning spring member (20). Then, the load spring member (10), the positioning control member (20) and the head holder (40) are spot-welded at a time to form a multi-channel head. It is evident that the manufacturing process as mentioned above is merely an exemplar and may be modified in various ways within the scope of the invention.

A fixed type multi-channel head device with the above-mentioned construction is used as shown in FIG. 5. As shown, the spring portions (21) of the position spring member (20) are used while being not bent as shown in FIG. 5, thereby to allow the slider (1) to be pressed against the recording surface (9) of a magnetic recording plate (8) until the slider (1) is aligned in parallel with the recording surface (9). The spring portions of the load spring (10), on the other hand, are bent by the height of the pivot (50), so that the reaction force F against the bending of the spring portion (11) presses the slider (1) against the recording surface (9) through the pivot (50). When the head device is used under this condition, the respective spring portions (21) of the positioning spring (20) serve merely to position the slider (1), while the respective springs of the load spring (10) serve merely to apply the load F to the slider (1) at the back of the slider (1).

Figure 1:
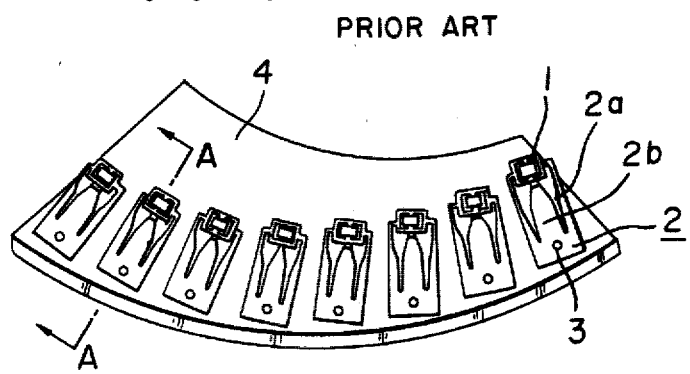
FIG. 1 shows a front view of a conventional fixed type multi-channel head device.
Figure 2:
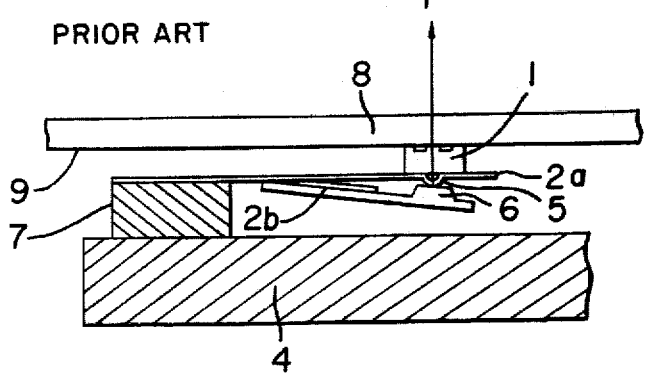
FIG. 2 shows a cross sectional view taken along line A—A shown in FIG. 1.

As will be recalled, in the conventional head device shown in FIG. 1, one positioning spring (2a) and one load spring (2b) assembled as one head assembly are provided for each slider (1). On the other hand, in the head device according to the invention, a single sheet of the positioning spring (20) having individual positioning spring portions formed therein for holding the respective sliders is used commonly for the respective sliders and a single sheet of the load spring (10) having the load spring portions (11) is similarly used commonly for the respective sliders, thereby to form one head assembly including a plurality of sliders. Therefore, the number of parts used in the multi-channel head device mentioned above as an embodiment of the invention is much smaller than that of the conventional one. Accordingly, the device is improved to that extent in the reliability, simple in the assembling work, and inexpensive in cost. The embodiment completely eliminates the need for the pivot formation, the bending work, and the spot-welding member (2) which were indispensable in the conventional one.

Further, the positioning spring (20) and the load spring (10) are both manufactured from a sheet of spring member, so that there is less of a variation in the spring portions formed thereon. Therefore, the head devices according to the invention are uniform in quality and high in reliability.

As will be recalled, the head assemblies each having the slider (1), the supporting device (2), the support (7) must be precisely positioned and fixed on the head holder (4). This is a very difficult and troublesome work. The embodiment of the invention is free from such a troublesome work. In manufacturing the positioning spring (20) by etching, for example, in the embodiment, if the narrowed portions to be filled in the U-shaped grooves of the slider (1) are transferred on the film used in the etching with the necessary accuracy, the positioning spring (20) finished up has the narrowed portions with the precision. If it so done, the slider may be precisely positioned by merely fitting the sliders (1) around the narrowed portions. The etching film once prepared with precision may be used repeatedly thereafter. Accordingly, the positioning marks or positioning holes (30) are simultaneously transferred onto the films of the positioning spring portions (21) and the load spring portions (11). Therefore, the positionings of them are possible with good reproducibility. Therefore, the difficult positioning work in manufacturing the conventional device is completely eliminated in this embodiment. Further, the etching is a very accurate art therefore to enable one slider to accurately be positioned with respect to the adjacent one. The embodiment of the manufacturing method of the invention is well adapted for the fixed type multi-channel head device with high density of data recording of the type requiring the precise positioning in the manufacturing.

Figure 10:
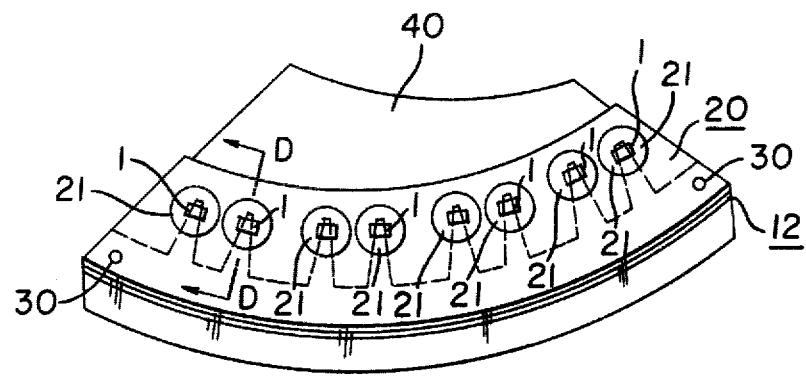
FIG. 10 shows a front view of another embodiment of the multi-channel head device according to the invention.
Figure 11:
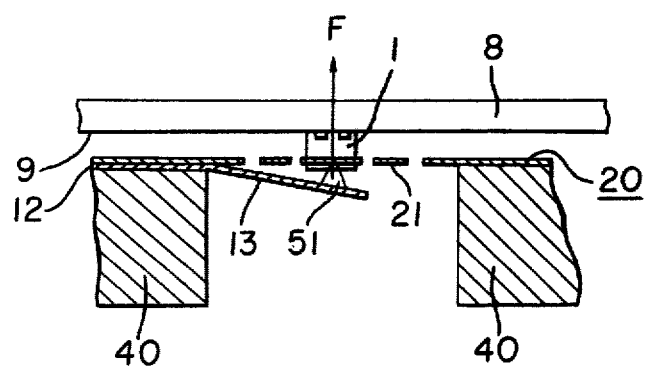
FIG. 11 shows a cross sectional view taken along line D—D in FIG. 10.

Turning now to FIG. 10, there is shown another embodiment of the multi-channel head device according to the invention. FIG. 11 shows a partial cross sectional view taken along line D—D in FIG. 10. A major difference of the embodiment of FIG. 10 from that of FIG. 3 resides in that, whereas the load spring (10) shown in FIG. 3 is of the gimbal spring type, a load spring (12) in FIG. 10 is of the cantilever type. The remaining structure of FIG. 10 is not different from that of FIG. 3. In short, a sheet of positioning spring (20)

holding a plurality of sliders is superposedly coupled with a load spring (12) having integrally a plurality of the cantilever type spring portions (3) with a plurality of pivots (51) intervening therebetween. The load spring (12) is manufactured and assembled like the load spring (10) in FIG. 3. The same role and effects as those of the load spring (10) shown in FIG. 3 can accordingly be attained. Therefore, the fixed type multi-channel head device shown in FIG. 10 has exactly the same function as that of the head device of FIG. 3 to ensure the useful effects of the invention.

As described above, the effects of the invention can be attained independently of the type and shape of each spring portion of the load spring and the positioning spring. The recording medium to which the head device according to the invention is applied may be any other suitable medium than the magnetic disc, for example, a magnetic sheet. The slider is not limited in the structure and shape and therefore may be of the monolithic type or a slider with a thin type head array. Furthermore, the pivot may be attached to either the positioning spring or the load spring.

I claim:

1. A multi-channel head device comprising:
   a plurality of floating head sliders for forming a multiplicity of channels;
   a positioning spring member having a plurality of individual positioning etched gimbal spring portions arranged on at least one sheet, each of said positioning spring portions holding a corresponding one of said floating head sliders;
   a load spring member having a plurality of individual etched cantelever load spring portions arranged on at least one sheet respectively corresponding to said positioning spring portions of said positioning spring member;
   pivot members which are disposed each between paired load and positioning spring portions, separating one from another, and permitting a resilient force developed in said each load spring portion to transfer therethrough to said floating head slider; and
   a head holder for holding a combination of said positioning spring member and said load spring member, both said positioning spring member and said load spring member being mated such that said positioning spring portions and said load spring portions are paired, respectively.

2. A multi-channel head device according to claim 1, wherein said positioning member, said load spring member and said head holder are each provided with positioning indicia, and said positioning spring member and said load spring member are aligned with each other in superposed manner and mated as one piece in said head holder.

* * * * *